L. G. ANDREWS.
CONTAINER.
APPLICATION FILED JAN. 13, 1919.
1,360,863.
Patented Nov. 30, 1920.
2 SHEETS—SHEET 1.
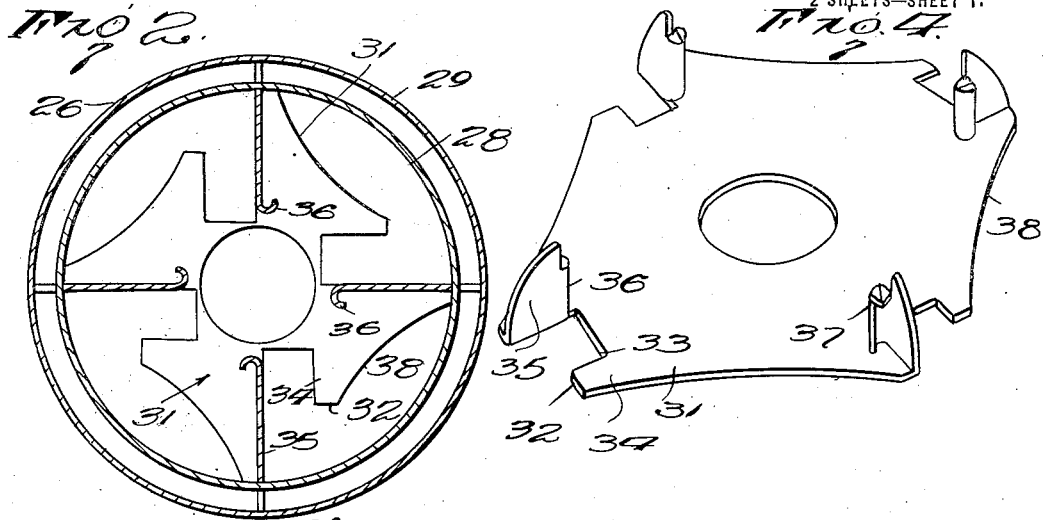
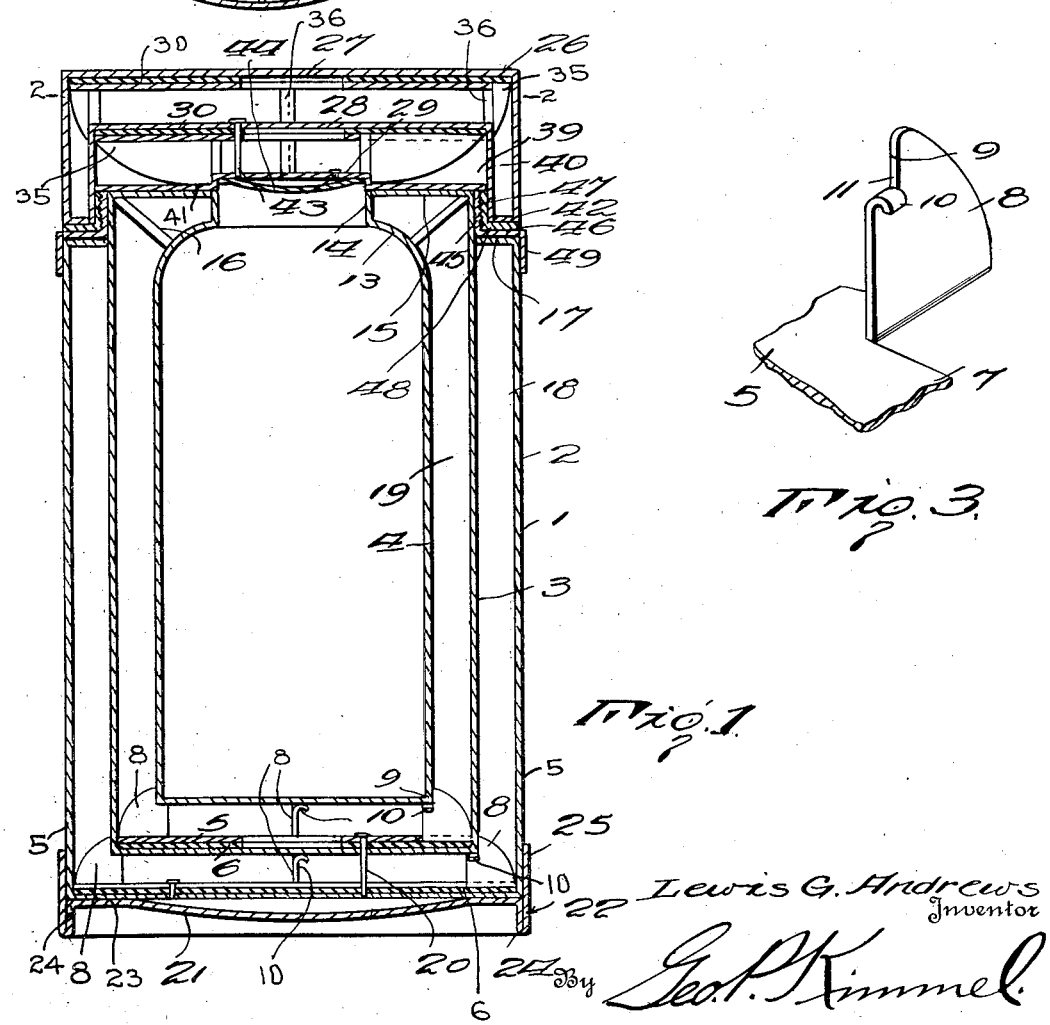
Lewis G. Andrews
Inventor
By Geo. P. Kimmel
Attorney

L. G. ANDREWS.
CONTAINER.
APPLICATION FILED JAN. 13, 1919.

1,360,863.

Patented Nov. 30, 1920.
2 SHEETS—SHEET 2.

Lewis G. Andrews
Inventor

By Geo. P. Kimmel
Attorney

UNITED STATES PATENT OFFICE.

LEWIS G. ANDREWS, OF DULUTH, MINNESOTA, ASSIGNOR OF ONE-HALF TO IRA G. KETCHAM, OF TOWER, MINNESOTA.

CONTAINER.

1,360,863.　　　　Specification of Letters Patent.　　Patented Nov. 30, 1920.

Application filed January 13, 1919.  Serial No. 270,919.

*To all whom it may concern:*

Be it known that I, LEWIS G. ANDREWS, a citizen of the United States, residing at Duluth, in the county of St. Louis and State of Minnesota, have invented certain new and useful Improvements in Containers; of which the following is a specification.

This invention comprehends improvements in containers and more particularly relates to a container of that type adapted to maintain a certain temperature for practical purposes for an indefinite period.

The invention has for its primary aim and object to provide a container of the above mentioned character designed with a plurality of vacuum chambers composed of spaced nesting shells while acting in conjunction therewith are improved elements designed to support an insulating plate, to maintain the shells in properly spaced relation and to prevent vibration of the shells thus perfecting the jointures and increasing the durability of the device in general.

The invention also embraces the provision of a device of the above mentioned character wherein the closure is of improved construction and enhances the desirability, durability and usefulness of the container, the closure being constructed to conform to the principles of the body of the container while coöperative means is provided on the closure and on the body for effecting a detachable and airtight engagement between the body of the container and the closure therefor.

It is a more specific object of this invention to provide a device of the above mentioned character wherein improved vent protectors are connected to the bottom of the body of the container and to the inner surface of the closure; and to construct the elements or plates having a two-fold purpose from blanks of sheet metal which are subsequently bent to assume a desired shape.

Among the other aims and objects of this invention may be recited the provision of a device of the above mentioned character wherein the number of parts are comparatively few, the construction simple, the cost of production low and the efficiency high.

Other objects, as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a vertical sectional view of one form of the container.

Fig. 2 is a horizontal sectional view through the closure being taken on line 2—2 of Fig. 1, Fig. 3 is a fragmentary perspective detail of one of the improved elements used in the body of the container, Fig. 4 is a perspective detail of one of the elements or plates used in the closure.

Similar characters of reference are employed in all of the above described views, to indicate corresponding parts.

Figure 6:
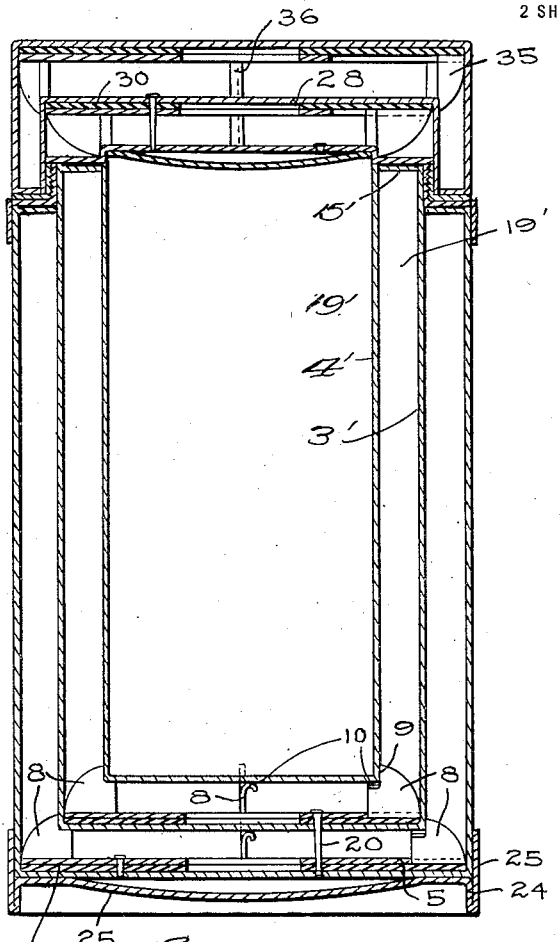
Fig. 6 is a vertical sectional view of a slightly modified form of container.
Figure 5:
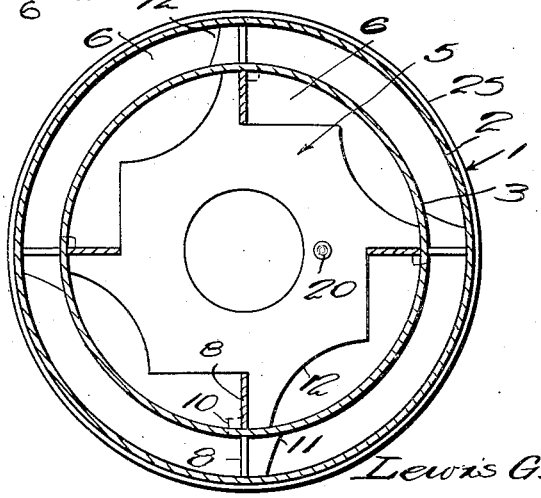
Fig. 5 is a transverse horizontal sectional view taken on line 5—5 of Fig. 1.

Referring now, more particularly to the accompanying drawings the improved container may be said to consist of a body generally designated by the numerals composed of a plurality, preferably three, spaced resting shells 2, 3 and 4 desirably of a cylindrical configuration and seamless being preferably formed of any desired metal or if desired the same may be formed of porcelain, glass, pottery, et cetera, as is apparent. Coöperating with these shells are the improved combination elements in the form of circular plates 5 of sheet metal. Circular insulating plates 6 are disposed against the under surfaces of the improved plates 5 and the coacting plates in turn placed in the outer shell 1 and the intermediate shell 3 to space the intermediate shell from the outer shell and the inner shell from the intermediate shell. This spacing and supporting of the shells relative to each other is effected by slitting the plates as at 7 and bending the portions to the outer sides of the slits upwardly to form radially disposed and opposed supporting lugs 8. The lugs in turn are provided with vertical slits 9 near their upper edges while the portions 10 provided by the slits are bent laterally to leave recesses 11 and to provide supporting flanges. In addition the plates 5 are cutaway as at 12 at suitable points along the outer edge to reduce the point of contact between the outer edges of the plate and the inner surface of the shell in which it is disposed. In Fig. 1 the lugs 8 have their rear edges curved and because of this construction do not contact with the inner surfaces of the walls of the shells 2 and 3 except at the very lowermost points and as the result will act to brace the shells against relative vibrattory movement since the outer edges and the bottoms of the adjacent shells are accommodated in the recesses 11 and disposed on the supporting flanges formed by the portions 10.
The inner shell 4 of the container is adapted to receive liquid such as milk, the upper portion thereof being restricted as at 13, terminating in a neck 14, the outer edge of which has soldered or otherwise effectively joined thereto the adjacent edge of the inturned annular flange 15 which continues from the upper portion of the intermediate shell 3. To insure of the maintenance of the shells 3 and 4 in properly spaced relation braces 16 are employed the respective ends being soldered or otherwise joined to the outer surface of the restricted portion 13 to the point of distortion or juncture between the flange 15 and the shell 3, preventing a collapsing of the upper part of the shell 3 at the time the vacuum is provided in a manner that will hereinafter become apparent. The outer shell 2 has its upper portion bent inwardly to provide an annular flange 17 the inner edge of which is joined to, as by soldering, et cetera, the outer surface of the intermediate shell 3 at a point beneath the upper edge thereof, as indicated. By this construction it will be apparent that two independent chambers 18 and 19 are provided and in producing a vacuum in the chambers it is preferred that the plates 5 and 6 be formed with registrable perforations in which are inserted vent tubes 20 and 21 to permit of the formation of a vacuum therein, the tubes being subsequently cut off and sealed.

In order to perfect the seals of the vent tubes 20 and 21 a protection bottom generally designated by the numeral 22 is telescopically fitted about and frictionally engaged with the outer surfaces of the lower portion of the outer shell 2, being engaged also against the bottom thereof. This protecting bottom consists of a disk-shaped body 23 which is positioned against the bottom of the shell 2, the portion being bent downwardly as at 24 forming an annular supporting rim while the portion continuing therefrom is reversely folded to form cylindrical attaching flanges 25 which also act as a brake for the rim 24, as is apparent.

As intimated, improved means has been provided for closing the container 1 and in the present instance consisting of a closure in the form of a cap generally designated by the numeral 26. In reducing this feature of the invention to practice, the same may be said to consist of a plurality of spaced cups or shells, preferably three, arranged desirably in an inverted form and indicated by the numerals 27, 28 and 29. Insulating plates or pads 30 are arranged against the under surfaces of the top of the outer shell 27 and the intermediate shell 28 while other improved combination elements or plates generally designated by the numeral 31 are employed for supporting the insulating plates, for maintaining the shells in properly spaced relation and for preventing vibration of the shells relative to each other. The plates 31 like the plates 5 are stamped from sheet metal and are of a circular form. Like the plates 5 they are also provided with slits 32 offset as at 33 medially of their lengths leaving supporting arms 34 to insure of the proper supporting of the insulating plates while the portions between the slits and the outer edges are bent downwardly to provide supporting lugs 35 having extensions 36 at their inner edges and these extensions are rolled and bent to provide supporting sleeves 37. In this connection it is to be noted that the inner edges of the supporting sleeves contact with adjacent main portions of the plates so as to be braced thereby. Like the lugs 8 the outer edges of the lugs 35 are curved so that only the outer edges of the plates contact with the inner surfaces of the walls or flanged portions of the shells 27 and 28 preventing relative vibration between the shells while the sleeves act to respectively maintain the shells in properly spaced relation, the arrangement being clearly indicated in Figs. 1 and 2 of the drawings. The plates 31 have portions of their outer edges cutaway as at 38 to reduce the point of contact between the plates 31 and the walls of the adjacent shells 27 and 28.

In closing the independent chambers 39 and 40 between the shells 27, 28 and 29, the inner shell is formed with a horizontal annular flange 41 the outer edge is joined with the inner surface of the wall of the shell 28, closing the chamber 40 while the chamber 39 is closed by the provision of the interior annular flange 42 which continues from the outer shell 27 and is joined with the outer edge of the intermediate shell 28.

In producing or forming a vacuum in each of the chambers 39 and 40, it is desired that the top of the shells 28 and 29 and the adjacent plates 30 and 31 be provided with registrable openings for accommodating vent tubes 43 and these tubes subsequent to the forming of the vacuum are cut off and sealed, the outer ends being desirably positioned in the top of the inner shell 29 said sealed ends being protected by an improved vent protector 44 in the form of a disk-plate which is frictionally engaged with the walls of the shell 29, the arrangement being clearly indicated in Fig. 1.

With a view toward providing the improved means on the body 1 and closure 26 to effect a detachable and airtight connection betwen the closure and the body, an annular exteriorly threaded collar 45 is employed being preferably turned from brass or other metal and also formed with an exterior annular attaching flange 46 near its inner edge, the collar 45 and its flange 46 being respectively welded, sealed or otherwise connected to the outer surface of the upper portion of the wall of the shell 3 and to the upper surface of the inturned annular flange 17 on the outer shell 2, as shown in Fig. 1. A complementally threaded and formed collar 47 having an exterior annular flange 48 is now provided and is soldered and sealed or otherwise connected to the inner surface of the outer portion of the shell 28 to the under surface of the inturned annular flange 42 and the free edge of the shell 28 as indicated. In this connection it is to be understood that these collars and their flanges are connected to the body and the closure preparatory to the forming of the vacuum in the chambers 18, 19, 39 and 40 while the body and the flange 46 are braced by an annular band or hook 49 which is arranged about and secured to the outer surface of the shell 2 near the upper edge thereof as indicated. When the cover or closure is connected to the body 1 besides the airtight engagement between the flanges 46 and 48, the flanges 15 and 41 are arranged in intimate contact with each other to further insure against the entrance of air to the inner shell or material container 4.

In Fig. 6 there is shown a slightly modified form of container, the construction being the same as that form disclosed in the remaining figures with the exception of the inner shell 4' of the container. In this instance the walls of the shells are not reduced, the diameter being the same throughout the height thereof and owing to this arrangement the annular flange 15' of the intermediate shell 3' constitutes a reinforcement for the upper part of the chamber 19' and obviating the supplying of braces 16 as in the form shown in Fig. 1. The remaining part is the same, the size and proportion varying slightly as indicated in order that the proper airtight strip may be provided between the body and its closure. In a container such as shown in Fig. 6 an ice cream freezer (not shown) may be readily carried bodily within the container shell 4' or ice cream or other solid matter may be contained in this shell, as is apparent.

It is believed in view of the foregoing description that a further detailed description of the operation of the invention is entirely unnecessary. Likewise, it is believed that the advantages of the invention will be readily apparent. It is, to be understood that the cylindrical shells are preferably constructed of smooth or plane surfaced sheet metal while flat oblong or square shells or containers are preferably constructed in part of corrugated sheet metal, in the form of triple walled vessels embodying the vacuum. In the course of construction, the metal from which the shells are formed are coated or processed with an agate or enameling solution or otherwise treated to make the metal impervious. It is to be understood however that the essentials of the invention are not affected by the rendering of the materials impervious. Materials which may be used are steel, iron, brass, copper, gold, silver, aluminum, tin, sheet iron, galvanized sheet iron, zinc or any other kinds of metal. The device may be constructed in part and assembled or joined together either by soldering, brazing, welding or otherwise and may be stamped, cast or molded out of metals rendering them seamless, with especially constructed dies.

It is also to be understood that the containers may be manufactured of any kind of material mentioned in the form of cans, pails, dinner pails, bottles, pots, pans, refrigerators, siphons, coolers, ice boxes, tanks, milk cans, ice cream cans, refrigerator cars, vehicle grips or traveling cases, cabinets, and any and all other forms or shapes or sizes, according to the purpose for which said container may be desired, or by or through which it is desired to retain liquids or other substances or space at a desired temperature for an indefinite period of time.

As many changes may be made in the above construction and as many apparently widely different embodiments of this invention may be made without departing from the scope thereof, it is intended that all matter contained in the above description or shown in the accompanying drawings, shall be interpreted as illustrative only and not in a limiting sense. It is also to be understood that the language used in the following claims is intended to cover all of the generic and specific features of the invention herein described and all statements of the scope of the invention, which, as a matter of language, might be said to fall therebetween.

Having thus fully described the invention, what is claimed as new and desired to be secured by Letters Patent, is:—

1. The combination with a container body and closure therefor, the body and closure being composed of a plurality of spaced nesting shells the free portions of which are flanged and joined to each other to close the chambers provided between the shells, of complementally threaded collars formed with attaching flanges secured respectively to the body and to the closure and designed to effect an airtight and detachable connection therebetween.

2. The combination with a container having a body and closure therefor, the body and closure composed of a plurality of spaced nested shells forming vacuum spaces therebetween, of spacing plates located between the shells and having lugs cut therefrom to space the shell apart, each lug being formed with a notch to constitute a seat for the shell and flanges at the notches to serve as rests for the said shells.

In testimony whereof I affix my signature hereto.

LEWIS G. ANDREWS.